(12) United States Patent
Gresset et al.

(10) Patent No.: US 11,129,334 B2
(45) Date of Patent: Sep. 28, 2021

(54) UNLOADING DEVICE, ROUND BALER, AND UNLOADING METHOD

(71) Applicant: DEERE & COMPANY, Moline, IL (US)

(72) Inventors: Pascal Gresset, Auxon Dessous (FR); Frederic Perrotin, Le Tremblois (FR); Romain Repecaud, Arc les Gray (FR)

(73) Assignee: DEERE & COMPANY, Moline, IL (US)

( * ) Notice: Subject to any disclaimer, the term of this patent is extended or adjusted under 35 U.S.C. 154(b) by 186 days.

(21) Appl. No.: 16/427,541

(22) Filed: May 31, 2019

(65) Prior Publication Data

US 2019/0364739 A1    Dec. 5, 2019

(30) Foreign Application Priority Data

Jun. 5, 2018   (DE) .......................... 102018208821.7

(51) Int. Cl.
*A01D 59/08*    (2006.01)
*A01F 15/08*    (2006.01)

(52) U.S. Cl.
CPC ............................... *A01F 15/0883* (2013.01)

(58) Field of Classification Search
CPC .. A01F 15/0875; A01F 15/0883; A01F 15/07; A01F 15/08; A01D 85/005; A01D 59/08; A01D 85/001; A01D 90/10; A01D 90/12
USPC ....................................................... 100/88
See application file for complete search history.

(56) References Cited

U.S. PATENT DOCUMENTS

| | | | | |
|---|---|---|---|---|
| 2,722,096 | A * | 11/1955 | Tice | A01F 15/0875 56/473.5 |
| 8,978,549 | B2 | 3/2015 | Thompson et al. | |
| 2003/0024407 | A1* | 2/2003 | Ehrenpfort | A01F 15/0883 100/8 |
| 2011/0271851 | A1* | 11/2011 | Pieper | A01F 15/0883 100/40 |
| 2013/0074709 | A1* | 3/2013 | Thompson | A01D 90/10 100/7 |
| 2016/0014967 | A1* | 1/2016 | Kraus | A01F 15/0883 414/812 |
| 2018/0020621 | A1* | 1/2018 | Jones | A01F 15/0883 56/341 |

(Continued)

FOREIGN PATENT DOCUMENTS

| | | |
|---|---|---|
| DE | 10254954 A1 | 6/2004 |
| EP | 0288600 A1 | 11/1988 |

(Continued)

OTHER PUBLICATIONS

European Search Report issued in counterpart application No. 19178026.1 dated Sep. 13, 2019. (8 pages).

*Primary Examiner* — Adam J Eiseman
*Assistant Examiner* — Dylan Schommer (57) ABSTRACT

An unloading device for unloading a round bale from a round baler includes a first support arm for unloading the round bale, a second support arm for unloading the round bale, and an actuator for operably controlling the first and second support arms. The first and second support arms are adjustably mounted on the round baler. Moreover, the first and second support arms are adjustably controlled by the actuator as a function of an unloading direction of the round bale.

6 Claims, 4 Drawing Sheets

(56) References Cited

U.S. PATENT DOCUMENTS

2019/0133044 A1\* 5/2019 Thompson .......... A01F 15/0883

FOREIGN PATENT DOCUMENTS

| EP | 1424000 A1 | 6/2004 |
|----|------------|--------|
| GB | 2292335 A | 2/1996 |
| NL | 2016842 A | 11/2017 |

\* cited by examiner

UNLOADING DEVICE, ROUND BALER, AND UNLOADING METHOD

RELATED APPLICATIONS

This application claims priority to German Patent Application Ser. No. 102018208821.7, filed Jun. 5, 2018, the disclosure of which is hereby incorporated by reference in its entirety.

FIELD OF THE DISCLOSURE

The present disclosure relates to an unloading device, and in particular, to an unloading device for unloading a bale from a round baler.

BACKGROUND

Round balers are known. In this case, agricultural crop material such as straw, grass or cereals is formed into a round bale in round balers and wrapped with a wrapping material, for example, net, film or twine. The round balers have a pickup and feeder device for the crop material to be packed, through which the crop material is introduced into a feeder opening of a bale chamber. The round baler can furthermore comprise a housing, wherein the housing can be designed in particular to be in two parts. The housing can also be disposed on a chassis.

The bale chamber comprises one or more packing means or mechanism, which are distributed on or at the housing part and the ejection flap and delimit the bale chamber around its sides. An engagement action on a round bale in the bale chamber that generates or maintains rotation can be produced by means of the packing means or mechanism. After the end of a packing operation, i.e., when the round bale has reached the required size and can be unloaded, the finished packed round bale then rolls downward on an unloading device, for example, an unloading ramp, from the bale chamber onto the ground.

Known unloading devices comprise an elongated carrier which is designed as a welded assembly and which is hinged on the housing or chassis of the round baler so as to be pivotable about a horizontal axis running transverse to the forward direction of the round baler and which is pretensioned upward by spring force (e.g., see DE 102 54 954 A1 or EP 0 288 600 A1). If the bale is ejected, the carrier moves downward against the force of the spring. In addition, vibration dampers are often also provided in order to dampen the vibrations of the unloading device if it strikes the ground or after it returns to the upper resting position after bale delivery.

A important problem in unloading a round bale from the bale chamber via the unloading device is the control of the unloading direction, i.e., the direction in which the round bale is to be deposited. Known unloading devices and round balers are structurally complex or are not designed to control the movement and the unloading direction of the round bale or to unload the round bale in a targeted and controlled manner in a plurality of fixed unloading directions. Instead, these conventional devices merely make it possible to unload the round bale in one unloading direction, namely behind the round baler. In addition, the round bale may not roll far enough away from the round baler so that the ejection flap cannot be lowered and the bale chamber cannot be closed. Or, the round bale becomes tilted too much and possibly remains seated on the drive axle or other transverse struts and does not roll down the unloading device, or its direction of rotation reverses, and twine wound around it falls off the round bale as it rolls down.

Furthermore, the safe unloading of the finished round bale, in particular in sloping or hilly terrain, is a problem during unloading. If the round bale is unloaded in sloping or hilly terrain, it may accidentally continue to roll, out of control, for example, down a hill, as a result of which the risk of accident is increased. For this reason, the operator of the round baler may first have to interrupt the collection of crop at the current work location in sloping or hilly terrain in order to find a suitable storage location for the round bale, i.e., a flat area, then move to the suitable storage location in order to unload the round bale there. Only then is operator able to return to the current work location. This process is very time-consuming and involves considerable expenditure.

Thus, it is desirable to provide an unloading device, a round baler, and an unloading method which largely avoid the disadvantages known in the art. In particular, the problem underlying the present disclosure is seen in controlling the unloading of the round bale, particularly in the unloading direction or the movement of the round bale, or enabling a reliable unloading of the round bale along hilly or sloping terrain.

SUMMARY

In the present disclosure, an unloading device for unloading a round bale from a round baler is proposed. The unloading device includes a first support arm for unloading a round bale and a second support arm for unloading a round bale and an actuator. The first and second support arms can be adjustably mounted on a round baler, and the first and second support arms can be positioned by means of the actuator as a function of an unloading direction of a round bale.

The special design and adjustability of the discharge direction by means of the actuator and the first and second support arms can be desirable. This has the effect that the deposition location or the deposition type of the finished round bale can be freely selected by means of the unloading device as a function of the unloading direction. The finished round bale can thus be deposited in the direction of or along a longitudinal axis of the round baler, thus behind the round baler. Moreover, the round bale is therefore unloaded or simply rolled off, deposited in a first or second direction in the direction of a transverse axis of the round baler (i.e., rolled off and tilted) or deposited to the side of the round baler. The transverse axis can run perpendicular to the longitudinal axis. In particular, a drive axle of the round baler can be aligned along the transverse axis or parallel to the transverse axis.

In other words, after or upon leaving the bale chamber, the round bale can be picked up by the unloading device and moved and unloaded by the unloading device to at least three unloading positions. A movement of the first and second support arms as a function of the unloading direction thus has the advantage that the round bale can be deposited not only behind the round baler, but the round bale can also be tilted and deposited in a first and second direction. The round bale can thus be deposited on the ground by means of the unloading device in the orientation it was received from the bale chamber, or else the longitudinal center axis of the round bale can be pivoted by 90° in the horizontal direction, and the round bale can be deposited to the side on its end face. Furthermore, due to the tilting of the round bale in the first or second direction, a rolling away movement can be reliably avoided, in particular on sloping or hilly terrain, so that the round bale does not roll down a slope. This reduces the risk of accidents.

It is thus possible to deposit the round bale safely and easily, in particular even on sloping or hilly terrain. Furthermore, the unloading device is structurally simple and can be produced inexpensively, and complicated and structurally complex devices for unloading the round bale will no longer be necessary. Since the round bale can be unloaded directly at the work site without costly interruption of the harvesting operation, i.e., without loss of time, the down time of the round baler is also markedly reduced and the unloading process becomes less complicated. Thus, more round bales can be produced per unit of time. In addition, the unloading device can be retrofitted to current round balers of a very wide variety of designs.

The first and second support arms can be designed as a first elongated support arm and a second elongated support arm or can serve, partly or over an entire length of the respective support arm in the direction of the respective longitudinal axis of the support arm, as a roll-off surface for the round bale ejected from the round baler onto the ground. The first and second support arms can be made of a rigid material, for example, a metal or plastic, or can be made of an inherently springy material such as, for example, spring steel, plastic or rubber. It is also conceivable for only portions of the support arm to be made of a springy material and for them to be disposed between inherently rigid portions of the carrier. The first support arm and the second support arm, which is in particular different from the first support arm, can be made in one piece or comprise a plurality of elements or be of telescopic design. That is to say, the support arms can be extended or elongated beyond a base length. The first and second support arms can be tubular, in particular hollow or solid cylindrical, for example, in the form of a hollow cylinder or a tube with closed ends. The first and second support arms can have a circular or elliptical or triangular or rectangular or polygonal cross section in a radial direction, i.e., radially to the respective longitudinal axis of the support arm.

The actuator can be a servomotor, for example, an electric motor, a hydraulic motor, a pneumatic motor or the like. Adjustable can be understood as meaning adjustable in position or pivotable. The first and second support arms can be adjustable in the direction of or along the transverse axis or drive axle or in the direction of or transverse to the drive axle and at the same time transverse to the longitudinal axis of the round baler. In particular, the first and second support arms can be horizontally or vertically adjustable in a flat terrain. In what follows, transverse can be understood as meaning that two axes, for example, the transverse axis or the longitudinal axis or a first and second bearing axis, enclose an angle of 60° to 120°, e.g. 80° to 100°, or alternatively an angle of exactly 90° to one another. The first and second bearing axes can also be disposed transverse to the transverse axis or transverse to the longitudinal axis.

In another embodiment of the present disclosure, the first support arm can be mounted on the round baler so as to be pivotable about a first bearing axis and the second support arm is mounted so as to be pivotable about a second bearing axis. The first and second support arms can additionally be mounted on the round baler so as to be pivotable about the transverse axis of the round baler, i.e., about the drive axle. The first support arm can be disposed by means of a first bearing and the second support arm can be disposed by means of a second bearing so as to be pivotable about the first and second bearing axes or about the transverse axis or drive axle on the round baler, i.e., on a chassis, the drive axle or a housing of the round baler, and more particularly can be attached or so as to be pivotable.

The first and second bearings thus serve for the adjustable articulation of the first and second support arms in the direction of or along the transverse axis or drive axle or transverse to the longitudinal axis on the round baler, that is to say for the attachment and articulation of the unloading device on the round baler. In other words, the first and second support arms can move independently of one another, i.e., can rotate independently of one another about the transverse axis or drive axle or first and second bearing axes. Thus, it is possible to achieve a superimposed two-dimensional pivoting movement of the first and second support arms, e.g., horizontal and vertical movement, and the unloading of the round bale in different unloading directions is made possible.

In a further embodiment of the present disclosure, the first and second support arms are movable or adjustable, in particular by means of the actuator, between a first unloading position, a second unloading position and a third unloading position. In the first unloading position, the first and second support arms are aligned in the direction of or along the longitudinal axis of the round baler, in particular transverse to the transverse axis and transverse to the first and second bearing axes. In the second unloading position, the first and second support arms are adjusted, in particular aligned or pivoted, in a first direction in the direction of or along the transverse axis. In the third unloading position, the first and second support arms are adjusted, in particular aligned or pivoted, in a second direction, which is opposite the first direction, in the direction of or along the transverse axis.

In yet another embodiment of the present disclosure, the first and second support arms can be adjusted by means of the actuator such that the first and second support arms are in the first unloading position. Here, the actuator holds the first and second support arms in the first unloading position when the round bale is unloaded in the direction of or along the longitudinal axis so that the round bale is rolled onto the ground by means of the first and second support arms along the longitudinal axis, or the actuator moves (e.g., pivots) and holds the first and second support arms from the first unloading position into the second unloading position. As it does, the round bale is rolled onto the ground by means of the first and second support arms and is tilted in a second direction when the round bale is unloaded in the second direction, or the actuator moves (e.g., pivots) and holds the first and second support arms from the first unloading position into the third unloading position. As it does, the round bale is rolled onto the ground by means of the first and second support arms and is tilted in a first direction when the round bale is unloaded in the first direction. Thus, the round bale can be unloaded in at least three unloading directions, i.e., not only in the direction of the longitudinal axis of the round baler, but can also be tilted in the first or second direction.

In another embodiment of the present disclosure, the first and second support arms can be adjusted by means of the actuator in such a way that, in the first unloading position, the first and second support arms can be pivoted only about the transverse axis, or, in the second unloading position, only the first support arm can be pivoted about the transverse axis, drive axle, or the first bearing axis, or, in the third unloading position, only the second support arm can be pivoted about the transverse axis, drive axle or the second bearing axis. In other words, in the first unloading position, the first and second support arms can thus be adjusted, i.e., aligned and held, such that they can be pivoted only about the transverse axis or drive axle and not about the first and second bearing axes (i.e., only in a vertical direction).

In the second unloading position, the first and second support arms can be adjusted, i.e., aligned or held, such that only the first support arm can be pivoted and the second support arm cannot be pivoted either about the transverse axis or about the second bearing axis. In other words, in the second unloading position, the first support arm can be adjusted during the unloading operation by means of the actuator in such a way that the latter can execute an independent rotational movement about the transverse axis or drive axle or the first bearing axis, while the second support arm can be held, or is held, in the second unloading position by means of the actuator. As a result, tilting of the cylindrical bale in the second direction can be achieved.

In the third unloading position, the first and second support arms can be adjusted, i.e., aligned or held, such that only the second support arm can be pivoted and the first support arm cannot be pivoted either about the transverse axis or about the first bearing axis. In other words, in the third unloading position, the second support arm can be adjusted during the unloading process by means of the actuator in such a way that the latter can execute an independent rotational movement about the transverse axis or drive axle or the second bearing axis, while the first support arm can be held, or is held, in the third unloading position by means of the actuator. As a result, tilting of the cylindrical bale in the first direction can be achieved.

In yet a further embodiment of the present disclosure, the first support arm may be divided into a first roll-off leg for rolling the round bale off and a first active leg, and the second support arm may be divided into a second roll-off leg for rolling the round bale off and a second active leg. In particular, the first bearing axle divides the first support arm into the first roll-off leg and the first active leg, and the second bearing axle divides the second support arm into the second roll-off leg and the second active leg. The actuator can be disposed on the first and second active legs, on a respective end of the first and second active legs, in particular can be operatively connected to the first and second active legs or can be adjustably attached to the first and second active legs, so that the first and second support arms can be adjusted by means of the actuator. The first and second roll-off legs can have a roll-off surface on an upper side of the respective support arm.

In an embodiment of the present disclosure, the first or second roll-off leg has a radius, in particular the first and second roll-off leg can be C-shaped. As a result, the round bale can be safely tilted and unloaded with the first or second support arm and in a manner resistant to interference.

The present disclosure further relates to a round baler with an unloading device as described herein. The round baler may comprise a bale chamber of fixed size. In this case, the packing means can be designed as a packing roller, in particular a plurality of packing rollers running parallel to one another for packing the crop. The axes of rotation of the packing rollers can lie on an arc of a circle when the ejection flap is closed, and at least one of the packing rollers can be driven. The disposal of the packing rollers in the bale chamber can correspond to a cylindrical shape, so that the packing rollers are disposed cylindrically around the round bale and form a cylindrical circumferential surface. Alternatively, the round baler can also be made with a bale chamber of variable-size, or as a round baler with a variable bale chamber, wherein the baling means can then be made as belts, belts or chain arrangements. The round baler can comprise an ejection flap. The ejection flap can be movable by means of a positioning device between an unloading position, in which the ejection flap is open and opens an ejection opening, and a closed position, in which the ejection flap is closed. In this case, the position adjusting device can be designed as a motor.

In this manner, the round bale can be picked up by the unloading device after or upon leaving the bale chamber and can be moved away from the bale chamber by the unloading device in at least three unloading directions. A movement of the first and second support arms as a function of the desired unloading direction has the advantage that the round bale can be deposited in a plurality of unloading directions. The round bale can thus be deposited on the ground by means of the round baler as it came from the bale chamber, or its longitudinal center axis can be pivoted or tilted horizontally by 90° and the round bale can be deposited to the side on its end face. This reliably avoids, among other things, a rolling away movement and enables the round bale to be deposited safely and easily, in particular even in sloping or hilly terrain.

In an embodiment of the present disclosure, the round baler comprises a drive axle, a bale chamber, in which a round bale can be produced, and the unloading device, which adjoins the bale chamber along a longitudinal axis of the round baler, wherein a finished round bale can be unloaded by the unloading device from the bale chamber onto a ground. The unloading device can in particular be disposed downstream of a forward direction to the bale chamber.

The round baler can also comprise a chassis, in particular the chassis comprises the driving axle. The unloading device can be disposed, in particular attached, to the axle or to the chassis or to the bale chamber.

In another embodiment of the present disclosure, the round baler can have an inclinometer for measuring a tilt of the round baler or a communication module for receiving information about the location of the round baler. Furthermore, the actuator can be operated as a function of the tilt or the location information of the round baler. The inclinometer can be used to measure the tilt, in particular a tilt angle of the round baler with respect to the vertical direction or a change in a tilt angle or the tilt angles with respect to gravity. The location information of the round baler can be the position of the round baler on the earth's surface or in a suitable geometric reference system. The location information can be determined, for example, by means of the global positioning system (GPS) and made available or received by means of the communication module. The communication module can be a GPS device or a WLAN device or a tablet or smartphone. The tilt or the location information provide information as to whether the round baler, in particular the current working location of the round baler, is located in sloping or hilly terrain. The round baler, in particular the unloading device, can thus advantageously be operated as a function of the tilt or the location information of the round baler, that is to say as a function of the current working location. In addition, the first, second, and third unloading positions can be established as a function of the tilt or the location information of the round baler. In both cases, a safe unloading of the round bale, in particular in sloping or hilly terrain, can be ensured.

The present disclosure further relates to an unloading method for unloading a round bale of a round baler and, in particular for unloading a round bale of a round baler. The round baler comprises an unloading device similar to the ones described herein. The round baler further comprises a drive axle, a bale chamber in which a round bale is produced, and the unloading device which adjoins the bale chamber along a longitudinal axis of the round baler. A finished round bale may be unloaded from the bale chamber onto a ground by the unloading device. The unloading device comprises an actuator, a first elongated support arm and a second elongated support arm for unloading the finished round bale. The first and second support arms are adjustably mounted on the round baler, and the first and second support arms are adjusted by means of the actuator as a function of an unloading direction of a round bale.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
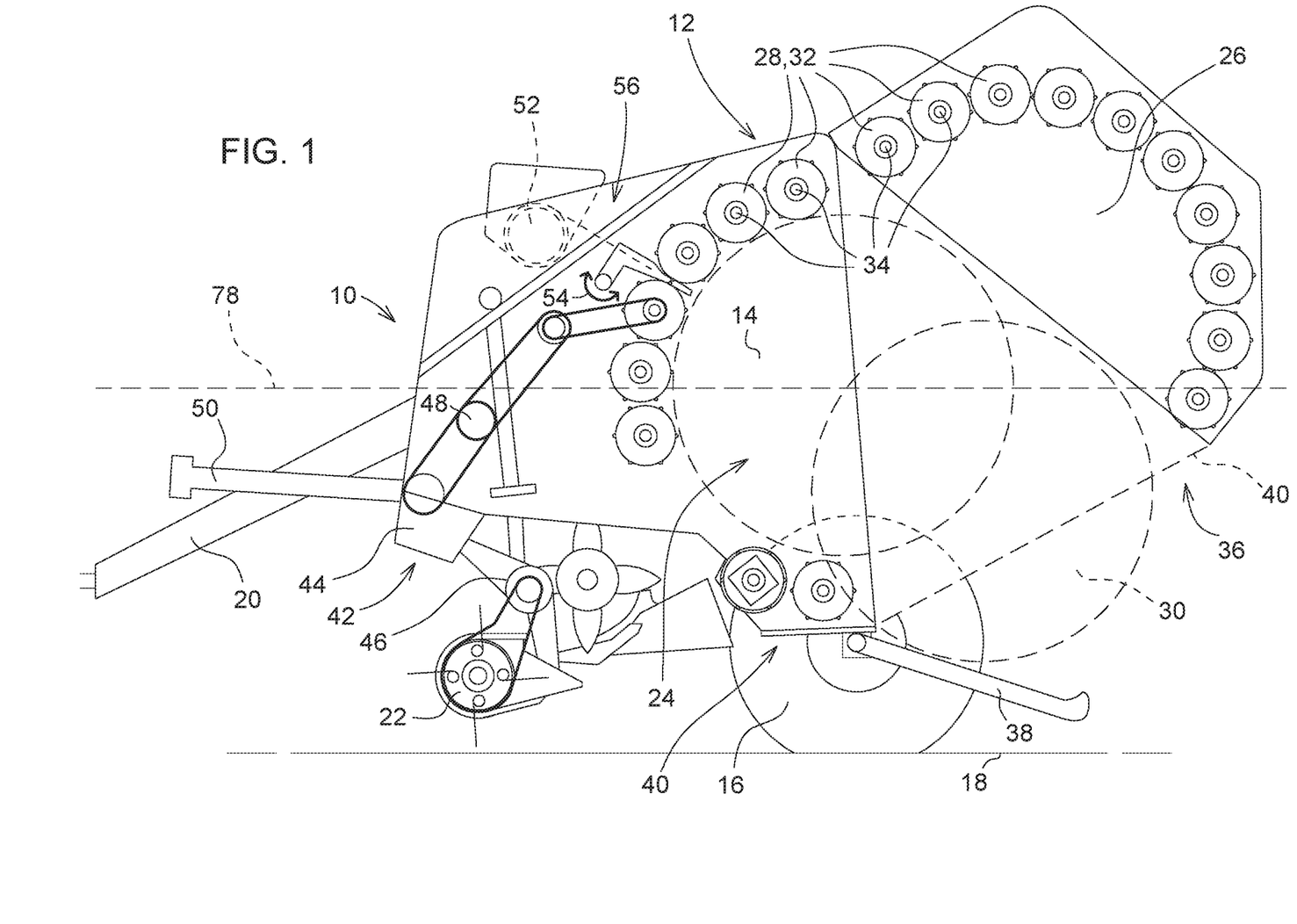
FIG. 1 shows a schematic side view of a first embodiment of a round baler with an unloading device.

FIG. 1 shows a schematic representation of a first embodiment of the round baler according to the present disclosure. The round baler 10 shown in FIG. 1 includes a housing 12 with a housing part 14 that is supported by means of wheels 16 on a ground 18 and can be hitched by means of a drawbar 20 to a traction vehicle (not shown) such as, e.g., a tractor or agricultural tractor.

At the front lower side of the housing part 14, i.e., in the direction of or along the longitudinal axis and in a forward direction of the round baler 10, a pickup and feeder device 22 for crop material is located in a known manner. The housing 12 also has an ejection flap 26 which is mounted on the housing part 14 such that it can pivot about an ejection axis and is located on the rear upper corner region of the housing part 14. A driven packing means or mechanism 28 is distributed on the housing part 14 and the ejection flap 26. The driven packing mechanism 28 delimits a bale chamber 24 around its sides and by means of which a rotation-generating or rotation-preserving engagement action on a round bale 30 located in the bale chamber 24 can be generated. Thus, the housing part 14 forms a front part of the bale chamber 24 and the ejection flap 26 forms a rear part of the bale chamber 24.

The round baler 10, which is designed with a fixed-size bale chamber 24, contains a plurality of packing elements 28 in the form of packing rollers 32 (only a few packing rollers 32 are illustrated for sake of simplicity) running mutually parallel to one another for packing crop material, the axes of rotation 34 of which are located on a circular arc with the ejection flap 26 closed and of which at least some are driven.

Figure 2A:
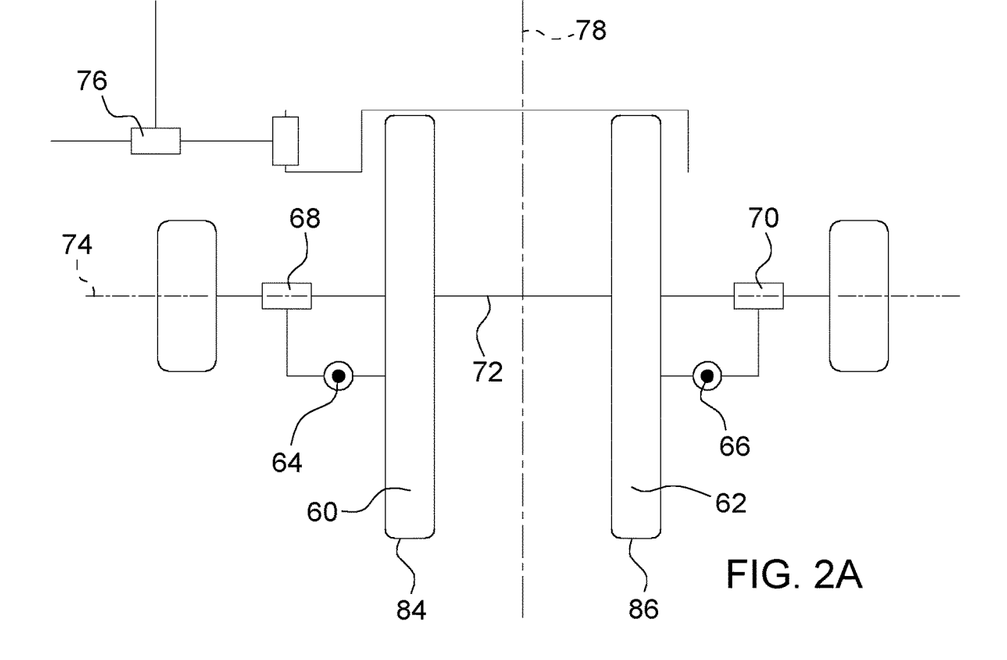
FIG. 2A shows a schematic top view of a first embodiment of an unloading device in a first unloading position.

The ejection flap 26 can be actuated (opened and closed) by means of a positioning actuating device (not shown). The ejection flap 26 can be pivoted by means of the positioning device in such a way that, when the ejection flap 26 is opened, an ejection opening 36 can be formed between the housing part 14 and the ejection flap 26. A round bale 30 packed by the round baler 10 can be ejected or discharged through the ejection opening 36. The round baler 10 further comprises a chassis 40 and a drive axle 72 and an unloading device 38, which adjoins the bale chamber 24 along a longitudinal axis 78 of the round baler 10. A finished packed round bale 30 can be unloaded from the bale chamber 24 onto a ground 18 by the unloading device 38. The round bale 30 moves in the direction of the discharge opening 36 and rolls onto the discharge device 38, via which the round bale 30 can be guided onto the ground 18. The drive axle 72 (see FIG. 2) is oriented in the direction of the transverse axis 74 (see FIG. 2).

The round baler 10 also has a drive system 42 with a gear arrangement 44, a first drive train 46, and a second drive train 48. A drive shaft 50 can be connected to a power take-off shaft (not shown) of the towing vehicle or tractor and serves as a drive for the drive system 36. The first drive train 46 is drive-connected via a first output (not shown) and the second drive train 48 is drive-connected via a second output (not shown) to the gearbox 44. The first drive train 46 drives the pickup and feeder device 22, and the second drive train 48 is provided to drive the packing means 28 or the packing rollers 32. The drive trains 46, 48 comprise all the drive components, which are disposed in a known manner in round balers for driving the pickup and feeder device 22 or for driving the packing means 28 and are connected on the drive side to the first output or the second output of the gearbox 44.

Furthermore, the round baler 10 comprises a wrapping device 56, which is equipped with a net or film roll 52 as wrapping material. The wrapping device 56 comprises a wrapping material feed 54, which guides the wrapping material from the net or film roll 52 into the bale chamber 24. Instead of a wrapping device 56, it is also possible to use a binding device (not shown) with binding twine, likewise in a known manner.

During a packing operation, the first and second drive trains 46, 48 are driven in parallel via the gearbox 44 or via the drive and the outputs, so that the pickup and feeder device 22 as well as the packing means or mechanisms 28, 32 are simultaneously kept in operation at a constant speed ratio to one another. After the crop pickup and the formation of the round bale 30 by the packing rollers 32 has been completed, the travel over the ground 18 can be, but does not have to be, interrupted, since the round baler 10 is filled with the round bale 30 and no further crop is or can be accommodated in the bale chamber 24. At this time, the wrapping device 56, which initiates a wrapping or binding process, is also activated. In the process, the wrapping material is wrapped around the round bale by a continuous rotation of the round bale 30, which is located in the bale chamber 24.

After a wrapping operation has been completed, the packing operation changes to the unloading operation and the round bale 30 is discharged through the ejection opening and the unloading device 38 onto the ground 18 by opening the ejection flap 26.

An important problem in unloading a round bale 30 from the bale chamber 24 via the unloading device 38 of the round baler 10 is the problem of controlling its movement, in particular in the unloading direction, that is to say the direction in which the round bale 30 is to be or will be deposited. The establishment of an unloading direction, in particular the targeted and controlled unloading of the round bale 30 in a fixed direction, is not possible or is possible only with difficulty with the known unloading device 38 or round balers 10 or unloading methods.

In order to be able to select and establish an unloading position of the round bale 30, the unloading device 38 designed here for unloading a round bale 30 of a round baler 10 comprises a first support arm 60 for unloading a round bale 30 and a second support arm 62 for unloading a round bale 30 and an actuator 76. In this case, the first and second support arms 60, 62 can be adjustably mounted on a round baler 10, and the first and second support arms 60, 62 can be adjusted by means of the actuator 76 as a function of an unloading direction of a round bale 30.

In this way, the round bale 30 can be received by the unloading device 38 after or upon leaving the bale chamber 24 and can be moved away and unloaded by the unloading device in at least three unloading directions. The unloading direction of the finished round bale 30 can thus be controlled and adjusted by means of the actuator 76 and the first and second support arms 60, 62. A movement of the first and second support arms 60, 62 as a function of the unloading direction thus has the advantage that the round bale 30 can not only be deposited behind the round baler 10, but can also be moved laterally along the transverse axis 74 in a targeted manner in a first and second direction 80, 82 respectively and tilted or rotated onto an end face of the round bale.

FIG. 2 shows a schematic top view of a first embodiment example of an unloading device 38 according to the present disclosure, in particular with parts of the round baler 10 in the first unloading position. The unloading device 38 shown in FIG. 2 substantially corresponds to the unloading device 38 shown in FIG. 1 on the round baler 10, so that only the differences will be described below. The first support arm 60 is mounted to the chassis 40 of the round baler 10 by means of a first bearing 68, and extends rearward along the longitudinal axis 78 to a first distal end 84. The second support arm 62 is mounted to the chassis 40 of the round baler 10 by means of a second bearing 70, and extends rearward along the longitudinal axis 78 to a second distal end 86. The first support arm 60 and the second support arm 62 are mounted on the round baler 10 so as to be pivotable about a first and second bearing axes 64, 66 respectively. The first and second bearing axes 64, 66 are arranged in a substantially vertical orientation, such that the first support arm 60 and the second support arm 62 rotate about the first and second bearing axes 64, 66 respectively in a generally horizontal orientation, such that the first distal end 84 of the first support arm 60 and the second distal end 86 of the second support arm 62 are moveable along the transverse axis 74, i.e., in a lateral direction relative to the longitudinal axis 78, as the first support arm 60 and the second support arm 62 rotate or pivot about the first and second bearing axes 64, 66. The first and second bearings 68, 70 are moreover pivotably disposed, in particular pivotably mounted or attached, on the drive axle 72 so that the first and second support arms 60, 62 are also mounted on the round baler 10 so as to be pivotable about the transverse axis 74 of the round baler 10. As such, the first distal end 84 of the first support arm 60 and the second distal end 86 of the second support arm 62 are moveable in a generally vertical direction as the first support arm 60 and the second support arm 62 rotate or pivot about the transverse axis 74. The first and second bearings 68, 70 thus provide lateral movement of the first and second support arms 60, 62 in the direction of or along the drive axle 72, i.e. along the transverse axis 74 and transverse to the longitudinal axis 78 of the round baler 10. Additionally, the first and second bearings 68, 70 provide rotational movement about the transverse axis 74.

The first and second support arms 60, 62 can be moved between a first unloading position (FIGS. 2A and 2B), in which the first and second support arms 60, 62 are aligned along the longitudinal axis 78 of the round baler 10 and both the first and second support arms 60, 62 are free to rotate about the transverse axis 74, a second unloading position (see FIGS. 3A and 3B) in which the first and second support arms 60, 62 are adjusted and aligned in a first direction along the drive axle 72 and only the second support arm 62 is free to rotate about the transverse axis 74, and a third unloading position (see FIGS. 4A and 4B) in which the first and second support arms 60, 62 are adjusted and aligned in a second direction and only the first support arm 60 is free to rotate about the transverse axis 74. In one example, the second direction is opposite the first direction.

Figure 2B:
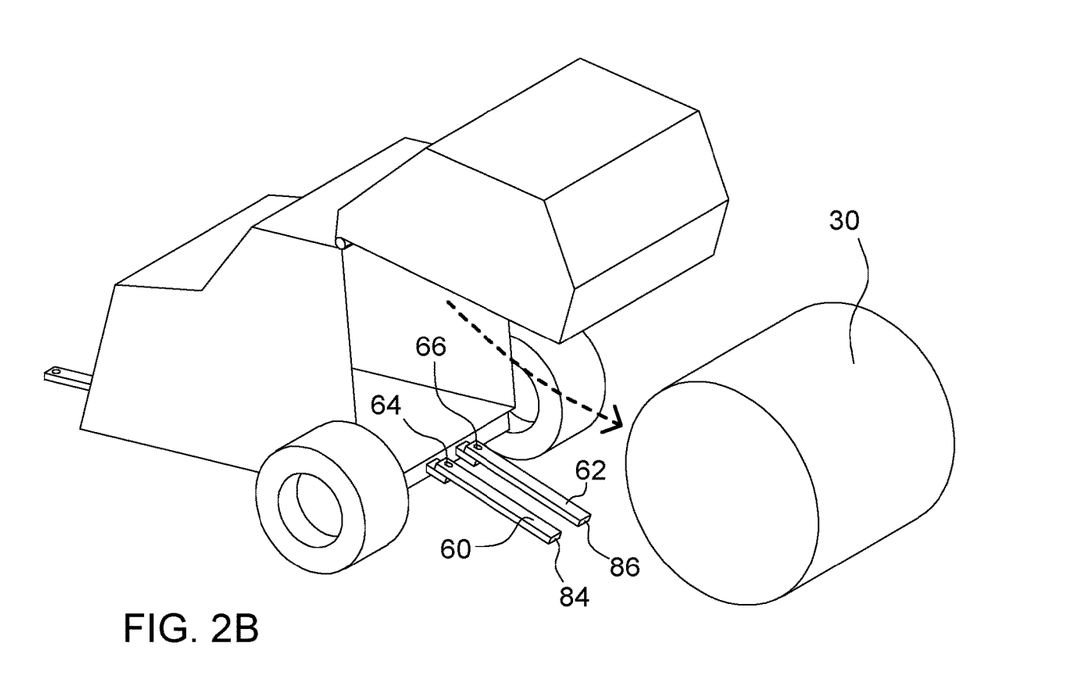
FIG. 2B shows a schematic perspective view of the unloading device in the first unloading position.

The first and second support arms 60, 62 can be adjusted by means of the actuator 76 in such a way that the first and second support arms 60, 62 are in the first unloading position when the round bale 30 is unloaded rearward in the direction of the longitudinal axis 78, i.e., behind the round baler 10. The round bale 30 can be rolled off along the longitudinal axis 78 onto the ground 18 by means of the first and second support arms 60, 62. In the first unloading position, the first and second support arms 60, 62 can be positioned by means of the actuator 76 in such a way that the first and second support arms 60, 62 can both pivot only about the drive axle 72, i.e., the transverse axis 74. The first and second support arms 60, 62 are connected to the actuator 76 and can be adjusted by means of the actuator on the first and second active legs (not shown). FIG. 2B shows the baler 10 in the first unloading position with both the first distal end 84 of the first support arm 60 and the second distal end 86 of the second support arm 62 rotated about the transverse axis 74 in a downward position adjacent the ground surface 18 to discharge the round bale 30 immediately rearward and along the longitudinal axis 78 of the round baler 10.

Figure 3A:
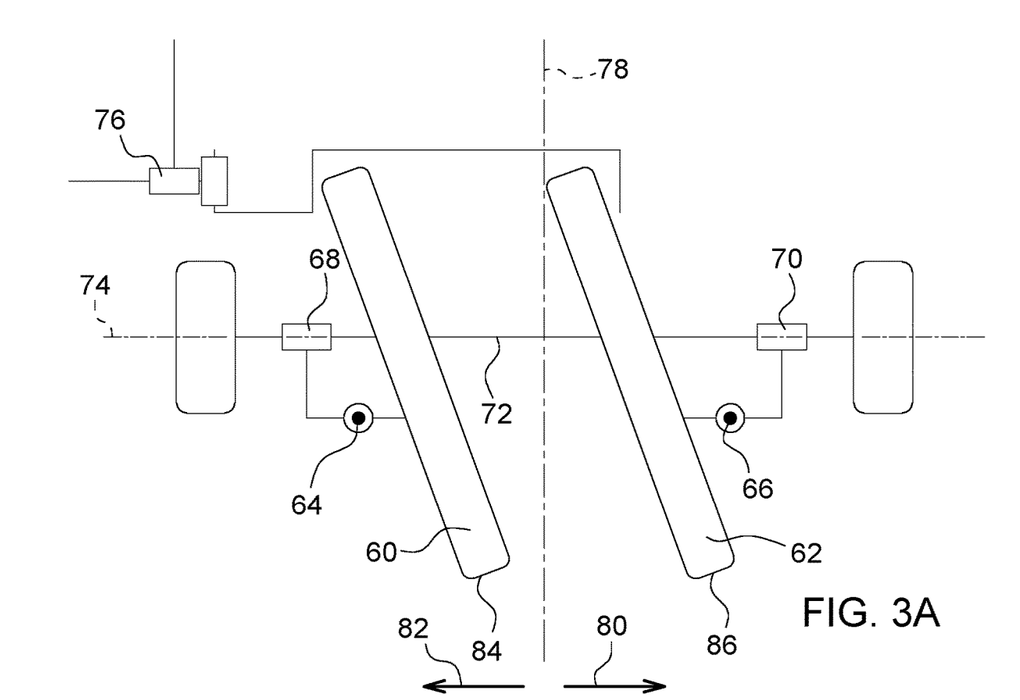
FIG. 3A shows a schematic top view of the unloading device of FIG. 2 in a second unloading position.
Figure 3B:
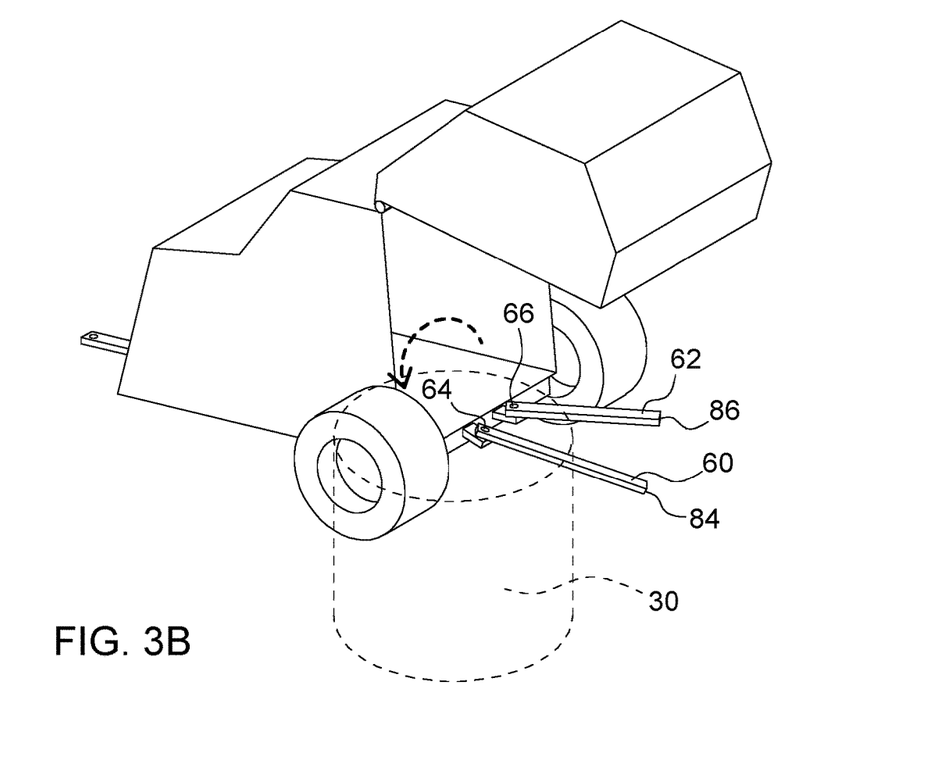
FIG. 3B shows a schematic perspective view of the unloading device in the second unloading position.

FIG. 3A shows a schematic top view of a first embodiment of an unloading device 38 according to the present disclosure with parts of the round baler 10 in the second unloading position. The unloading device 38 shown in FIGS. 3A and 3B substantially corresponds to the unloading device 38 shown in FIGS. 1-2B and 2, so that only the differences are discussed below. To move into the second unloading position, the actuator 76 rotates the first and second support arms 60, 62 about the first bearing axis 64 and the second bearing axis 66 respectively, such that the first distal end 84 of the first support arm 60 and the second distal end 86 of the second support arm 62 are moved in the first direction 80 into the second unloading position. In addition, in the second unloading position, only the first support arm 60 can pivot about the transverse axis 74, i.e., the drive axle 72. As a result, during unloading, the round bale 30 is unloaded and moved in the second direction 82 relative to the longitudinal axis 78 by means of the first and second support arms 60, 62, i.e., it is rolled onto the ground 18 and tilted in the second direction 82 onto an end face of the round bale 30. FIG. 3B shows the baler 10 in the second unloading position with both the first distal end 84 of the first support arm 60 and the second distal end 86 of the second support arm 62 moved laterally along the transverse axis 74 toward the right side of the baler 10 when compared to the first unloading position, with the first distal end 84 of the first support arm 60 positioned in a downward vertical position adjacent the ground surface 18 to discharge the round bale 30 laterally away from the longitudinal axis 78 in the second direction 82, and onto an end face of the round bale 30.

Figure 4A:
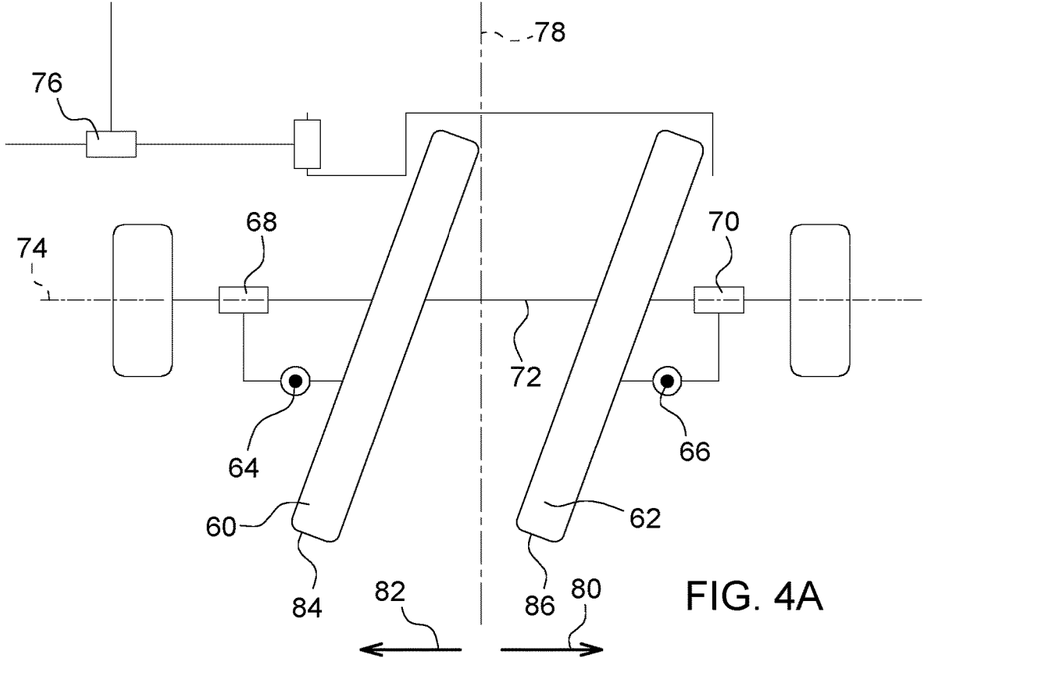
FIG. 4A shows a schematic top view of the unloading device in a third unloading position.
Figure 4B:
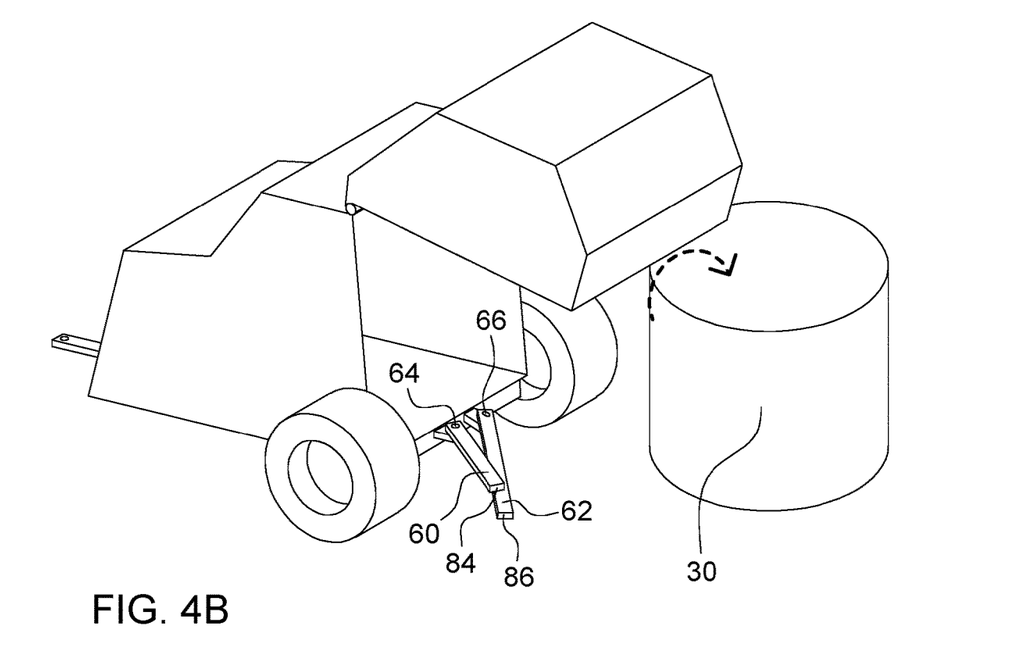
FIG. 4B shows a schematic perspective view of the unloading device in the third unloading position.

FIG. 4A shows a schematic top view of an unloading device 38 according to the present disclosure. The unloading device 38 is shown in particular with parts of the round baler 10 and is disposed in the third unloading position. The unloading device 38 shown in FIGS. 4A and 4B substantially corresponds to the unloading device 38 shown in FIGS. 1-3B, and so only the differences will be discussed below. To move into the third unloading position, the actuator 76 rotates the first and second support arms 60, 62 about the first bearing axis 64 and the second bearing axis 66 respectively, such that the first distal end 84 of the first support arm 60 and the second distal end 86 of the second support arm 62 are moved in the second direction 82 into the third unloading position. In addition, in the third unloading position, only the second support arm 62 can be pivoted about the transverse axis 74 (i.e., the drive axle 72). As a result, during unloading, the round bale 30 is unloaded and moved in the first direction 80 relative to the longitudinal axis 78 by means of the first and second support arms 60, 62, i.e., it is rolled onto the ground 18 and tilted in the first direction 80 onto an end face of the round bale 30. FIG. 4B shows the baler 10 in the third unloading position with both the first distal end 84 of the first support arm 60 and the second distal end 86 of the second support arm 62 moved laterally along the transverse axis 74 toward the left side of the baler 10 when compared to the first unloading position, with the second distal end 86 of the second support arm 62 positioned in a downward vertical position adjacent the ground surface 18 to discharge the round bale 30 laterally away from the longitudinal axis 78 in the first direction, 80 and onto an end face of the round bale 30.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An unloading device for unloading a round bale from a round baler, comprising:
   a first support arm extending along a longitudinal axis to a first distal end and configured for rotation about a transverse axis that is perpendicular to the longitudinal axis;
   a second support arm extending along the longitudinal axis to a second distal end and configured for rotation about the transverse axis;
   an actuator coupled to the first support arm and the second support arm and selectively controllable to rotate the first support arm about a first bearing axis and the second support arm about a second bearing axis,
   wherein the first bearing axis and the second bearing axis each extend in a substantially vertical orientation;
   wherein the actuator is selectively controllable to position the first support arm and the second support arm in a first unloading position in which both the first support arm and the second support arm are free to rotate about the transverse axis to move the first distal end and the second distal end in a vertical direction to unload the round bale on a circumferential surface of the round bale along the longitudinal axis; and
   wherein the actuator is selectively controllable to position the first support arm and the second support arm in a second unloading position in which the first distal end of the first support arm and the second distal end of the second support arm are positioned laterally in a first direction along the transverse axis relative to their respective positions in the first unloading position, with the first support arm free to rotate about the transverse axis to move the first distal end in the vertical direction and with the second support arm prevented from rotation about the transverse axis to prevent movement of the second distal end in the vertical direction to unload the round bale in a second direction relative to the longitudinal axis and to tilt the round bale onto an end face of the round bale.

2. The unloading device of claim 1, wherein:
   the actuator is selectively controllable to position the first support arm and the second support arm in a third unloading position in which the first distal end of the first support arm and the second distal end of the second support arm are positioned laterally in the second direction along the transverse axis relative to their respective positions in the first unloading position, with the second support arm free to rotate about the transverse axis to move the second distal end in the vertical direction, and with the first support arm prevented from rotation about the transverse axis to prevent movement of the first distal end in the vertical direction, to unload the round bale in the first direction relative to the longitudinal axis and to tilt the round bale onto an end face of the round bale.

3. A round baler for forming a round bale of crop, comprising:
   a chassis extending along a longitudinal axis;
   a drive axle attached to the chassis and defining a transverse axis that is perpendicular to the longitudinal axis;
   a bale chamber for forming the round bale into a cylindrical shape having a circumferential surface and an end face; and
   an unloading device coupled to the bale chamber, the unloading device configured to discharge the round bale from the bale chamber in an unloading direction;
   wherein, the unloading device includes:
      a first support arm coupled to the chassis and extending rearward along the longitudinal axis to a first distal end, wherein the first support arm is rotatable about the transverse axis;
      a second support arm coupled to the chassis and extending rearward along the longitudinal axis to a second distal end, wherein the second support arm is rotatable about the transverse axis;
      an actuator coupled to the first support arm and the second support arm and selectively controllable to rotate the first support arm about a first bearing axis to move the first distal end of the first support arm along the transverse axis, and rotate the second support arm about a second bearing axis to move the second distal end of the second support arm along the transverse axis for operably controlling the first and second support arms;

wherein the actuator is selectively controllable to position the first support arm and the second support arm in a first unloading position in which both the first support arm and the second support arm are free to rotate about the transverse axis to move the first distal end and the second distal end in a vertical direction to unload the round bale on the circumferential surface of the round bale along the longitudinal axis; and wherein the actuator is selectively controllable to position the first support arm and the second support arm in a second unloading position in which the first distal end of the first support arm and the second distal end of the second support arm are positioned laterally in a first direction along the transverse axis relative to their respective positions in the first unloading position, with the first support arm free to rotate about the transverse axis to move the first distal end in the vertical direction, and with the second support arm prevented from rotation about the transverse axis to prevent movement of the second distal end in the vertical direction, to unload the round bale in a second direction relative to the longitudinal axis and to tilt the round bale onto the end face of the round bale.

4. The round baler of claim 3, further comprising:
an inclinometer for measuring a tilt of the round baler; and
a communication module for receiving location information of the round baler.

5. The round baler of claim 4, wherein the actuator is operably controlled as a function of the tilt or the location information of the round baler.

6. The round baler of claim 3, wherein:
the actuator is selectively controllable to position the first support arm and the second support arm in a third unloading position in which the first distal end of the first support arm and the second distal end of the second support arm are positioned laterally in the second direction along the transverse axis relative to their respective positions in the first unloading position, with the second support arm free to rotate about the transverse axis to move the second distal end in the vertical direction, and with the first support arm prevented from rotation about the transverse axis to prevent movement of the first distal end in the vertical direction to unload the round bale in the first direction relative to the longitudinal axis and to tilt the round bale onto an end face of the round bale.

* * * * *